United States Patent
Amundson et al.

(10) Patent No.: US 7,637,024 B2
(45) Date of Patent: Dec. 29, 2009

(54) MAGNETIC FIELD SENSING DEVICE FOR COMPASSING AND SWITCHING

(75) Inventors: Mark D. Amundson, Cambridge, MN (US); Hong Wan, Plymouth, MN (US); William F. Witcraft, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 52 days.

(21) Appl. No.: 11/259,017

(22) Filed: Oct. 26, 2005

(65) Prior Publication Data

US 2007/0089311 A1 Apr. 26, 2007

(51) Int. Cl.
 *G01C 17/38* (2006.01)
(52) U.S. Cl. .................................. 33/355 R; 33/356
(58) Field of Classification Search ............... 33/355 R, 33/356–361
See application file for complete search history.

(56) References Cited

U.S. PATENT DOCUMENTS

| | | | | |
|---|---|---|---|---|
| 5,485,517 | A * | 1/1996 | Gray .................... | 379/433.13 |
| 5,596,551 | A * | 1/1997 | Born et al. ................... | 33/271 |
| 6,060,969 | A * | 5/2000 | Hufgard et al. ............. | 335/207 |
| 6,132,391 | A * | 10/2000 | Onari et al. ................. | 600/595 |
| 6,140,933 | A * | 10/2000 | Bugno et al. ............... | 33/355 R |
| 6,230,028 | B1 * | 5/2001 | Shirakawa ................... | 455/566 |
| 6,543,146 | B2 * | 4/2003 | Smith et al. .................. | 33/356 |
| 6,690,253 | B1 * | 2/2004 | Precure ...................... | 335/205 |
| 7,028,410 | B2 * | 4/2006 | Sato et al. ................... | 33/356 |
| 7,053,608 | B2 * | 5/2006 | Friend et al. ................. | 33/361 |
| 7,074,045 | B2 * | 7/2006 | Kawahigashi et al. ......... | 439/38 |
| 7,210,236 | B2 * | 5/2007 | Sato et al .................... | 33/356 |
| 7,288,934 | B1 * | 10/2007 | Ikarashi et al. ......... | 324/207.21 |
| 2005/0020097 | A1 * | 1/2005 | Kawahigashi et al. ......... | 439/38 |
| 2006/0289624 | A1 * | 12/2006 | Olmos et al. ................ | 235/375 |
| 2008/0172174 | A1 * | 7/2008 | Okeya ........................ | 701/208 |
| 2008/0294336 | A1 * | 11/2008 | Okeya ........................ | 701/208 |

FOREIGN PATENT DOCUMENTS

JP 2003166826 A 6/2003

OTHER PUBLICATIONS

Caruso, Michael J., et al., "A New Perspective on Magnetic Field Sensing," Sensors—Dec. 1998, printed from the World Wide Web on Oct. 28, 2004, <http://www.sensorsmag.com/articles/1298/mag1298/main.shtml>, pp. 1-14.

(Continued)

*Primary Examiner*—Yaritza Guadalupe-McCall
(74) *Attorney, Agent, or Firm*—Fogg & Powers LLC

(57) ABSTRACT

A magnetic field sensing device can be realized by using a magnetic sensor in electronic compassing as well as switching. A magnet can be brought in close proximity to the magnetic sensor within an electronic compass to generate a signal that a portable information device has been closed. This signal can be input to a processor or other circuitry to initiate a response to the portable information device being closed. When the magnet is moved out of close proximity to the magnetic sensor, the magnetic sensor can be used in the electronic compass. Thus, a magnetic sensor can serve two functions, namely compassing and switching, reducing the need for separate sensors to perform both functions.

22 Claims, 6 Drawing Sheets

OTHER PUBLICATIONS

Bratland, Tamara, et al., "Linear Position Sensing Using Magnetoresistive Sensors," Honeywell Solid State Electronics Center.

Graham, Christine, "A Low-Power Hall Effect Switch," Sensors—Jun. 1999, printed from the World Wide Web on Oct. 28, 2004, <http://www.sensorsmag.com/articles/0699/0699_p44/main.shtml>.

"Reference Design: Low Cost Compass," AN214, Honeywell Sensor Products, Solid State Electronics Center.

* cited by examiner

MAGNETIC FIELD SENSING DEVICE FOR COMPASSING AND SWITCHING

BACKGROUND

1. Field of Invention

The present invention generally relates to magnetic field sensing, and more particularly to a magnetic field sensor device that can be used in both compassing and power switching functions.

2. Description of Related Art

Magnetic field sensors are designed to detect changes or disturbances in magnetic fields. From this initial detection, the sensors are able to derive information on properties such as direction, presence, rotation, angle, or electrical currents. Magnetic field sensing has a variety of applications including navigation, medical diagnostics, surveillance, mechanical component characterization, and detection of minerals, electrical devices, and power lines.

Consumer and non-consumer devices are constantly being updated to include more and more features. Magnetic field sensing is likely to become a part of many of these devices. For example, cell phones will be able to provide compassing functions by including magnetic sensing circuitry in their designs. Cell phones (e.g. flip-style or sliding-style phones) can also use a magnet and magnetic sensor to determine when a user has opened the phone, so that the screen can be powered up. Other consumer devices, such as Personal Digital Assistants (PDAs), portable computers (e.g. notebook computers), and handheld GPS receiver units could similarly make use of magnetic field sensing to provide increased functionality to the user.

For flip-style cell phones, switching typically has been achieved by placing a Hall Effect sensor in one panel of the phone and a permanent magnet in the other panel of the phone. When the phone is closed, the sensor and magnet are in close proximity, such as on top of each other. A voltage is applied to the sensor in such a way that in this closed configuration the Hall voltage is zero and power to the display and/or other components is off. When the phone is opened the sensor and the magnet are no longer in close proximity. Given the same applied voltage in this open configuration, a Hall voltage will be created and power can be switched on (e.g. to light up the screen display).

Magnetic compassing sensors and on/off power switching sensors are typically separate, unintegrated devices. The two sensors are designed to measure different target magnetic fields: the compassing sensors measure the Earth's magnetic field, while power switching sensors measure the close presence of a permanent magnet, for example.

Because size and cost are primary drivers in many consumer devices, a single magnetic field sensor device that combines both magnetic compassing and on/off power switching would be desirable. This device would be able to distinguish between a compassing signal and a power switching signal.

SUMMARY

One embodiment provides for a magnetic field sensing device for compassing and switching used within a portable information device. The device is comprised of a magnet and a two axis magnet sensor. The magnetic sensor is used as a compass when the magnet is placed away from the magnet. When the magnet is brought close to the sensor, the sensor creates a signal that can be used by circuitry, such as a processor, to process the signal. The processor can then de-active circuits, turn off external components such as lights or speakers as well as perform various other functions.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Preferred embodiments of the present invention are described with reference to the following drawings, wherein.

DETAILED DESCRIPTION

In view of the wide variety of embodiments to which the principles of the present invention can be applied, it should be understood that the illustrated embodiments are examples only, and should not be taken as limiting the scope of the present invention.

Figure 1:
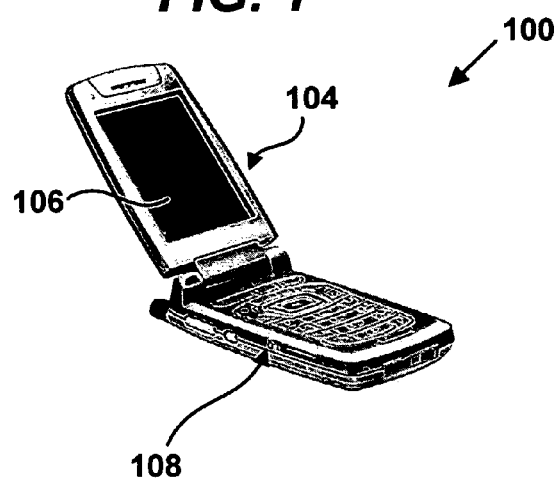
FIG. 1 is a pictorial diagram of a cell phone having a flip-panel.

FIG. 1 is a pictorial drawing of a typical flip-style cell phone 100 having a display panel 104 and a keypad panel 108. The display panel comprises a backlit display 106 as well as other components such as a speaker, external LED lighting and various other elements. In this embodiment, a magnet is embedded inside the display panel. The keypad panel 108 comprises numeric or alphanumeric keys, as well as additional elements such as volume control keys, a headset jack and additional control keys. Additionally, the keypad panel incorporates a magnetic sensor. When the cell phone is closed, the embedded magnet, in close contact with the magnetic sensor, keeps at least some cell phone functions in an off or standby state. Conversely, when the phone is opened the magnet moves away from the magnetic sensor and the cell phone is turned on or made active. For example, a variety of responses may occur upon opening the phone, including the display and numeric or alphanumeric keys lighting up. Additionally, the master power may be similarly controlled.

Figure 2:
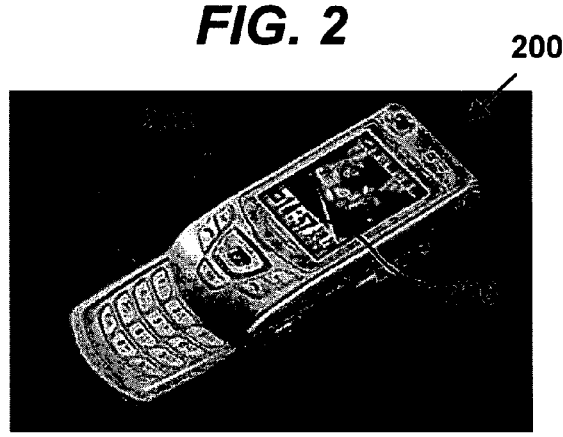
FIG. 2 is a pictorial diagram of a cell phone having a slide-panel.

FIG. 2 is a pictorial drawing of a "sliding" cell phone 200 having a display panel 204 and a "slide-out" keypad panel 208. The display panel and keypad panel have the same essential elements as the flip-style cell phone, including an embedded magnet in the display panel and a magnetic sensor in the keypad panel (or vice-versa). When the cell phone is closed, the magnetic sensor 202, in close contact with the magnet 210, keeps the cell phone off. Alternatively, when the magnetic sensor (keypad panel) is slid away from the magnet, the cell phone is turned on. Again, the display or keys may light up upon sliding the cell phone open. For either cell phone 100 or 200, the locations of the magnet and magnetic sensor may be swapped, so that the magnet is in the keypad panel and the magnetic sensor is in the display panel.

Figure 3:
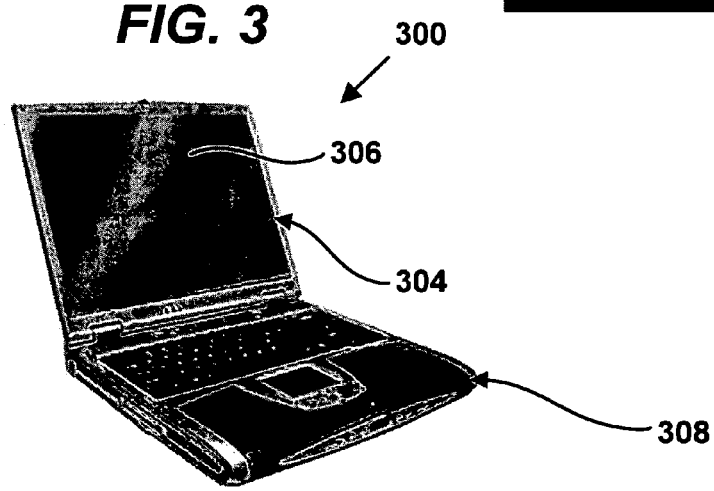
FIG. 3 is a pictorial diagram of a notebook computer.

FIG. 3 is a pictorial drawing of a notebook computer 300 having a display panel 304 and a keyboard panel 308. The display panel comprises an LCD type display 306, and includes an embedded magnet. The keyboard panel 308 comprises alphanumeric keys, portable drives, inputs (USB, microphone, etc.) outputs (USB, headphone, serial ports, etc.) as well as other elements. The keyboard panel also incorporates a magnetic sensor. In this embodiment, when the laptop computer is closed, the magnet, in close contact with the magnetic sensor, keeps the computer in an off or idle state. Alternatively, when the magnetic sensor moves away from the magnet, the computer is turned on or returns to an active state. The magnetic sensor and magnet can be embedded in either the keyboard or display panel.

Figure 4:
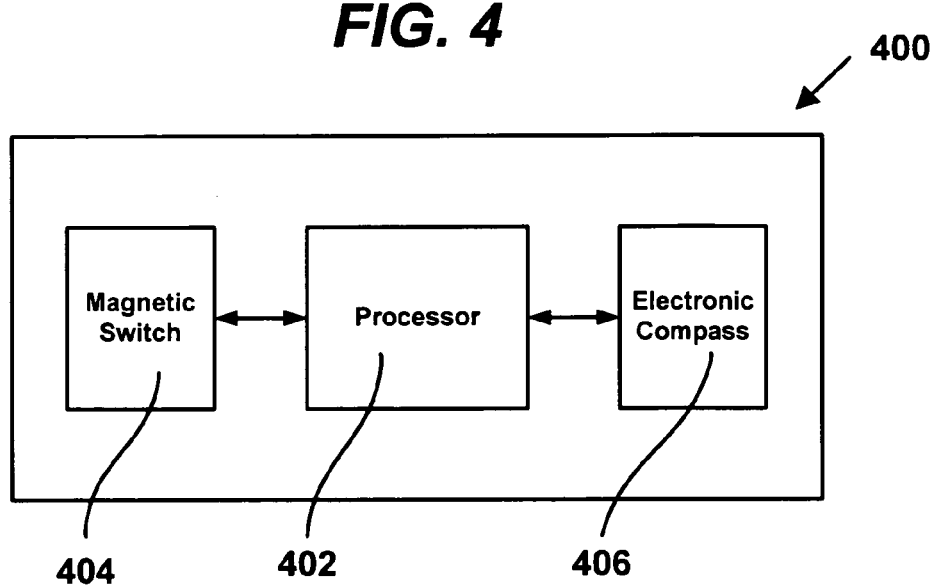
FIG. 4 is a block diagram of a device having an electronic compass and a magnetic switch, according to an embodiment of the present invention.

FIG. 4 is a block diagram of a portable information device 400. The processor 402 of such a device communicates with a magnetic switch 404 and an electronic compass 406. The magnetic switch provides a signal that can be used to determine if the device is open or closed. The magnetic switch may also power on or off the processor or other components of the portable information device 400. The electronic compass provides signals that can be used by the processor to determine direction or heading. Note that, as used herein, the term "electronic compass" may refer to a complete compass circuit that outputs a signal indicating direction. In most cases, however, "electronic compass" instead refers to an arrangement of magnetic sensors configured to sense the presence of a magnetic field and output one or more signals that are proportional to magnetic field strength or direction, from which a processor (e.g. microcontroller, microprocessor w/software, dedicated logic circuitry, etc.) can determine directions or heading. Both implementations are intended to be within the scope of various embodiments of the present invention.

Figure 5:
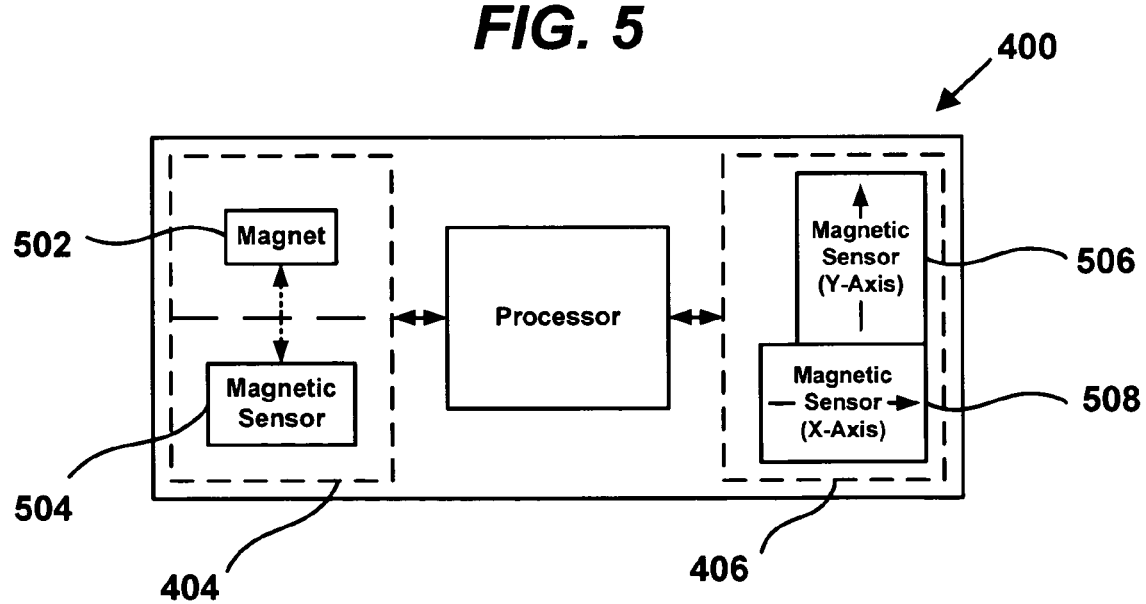
FIG. 5 is a block diagram showing the device of FIG. 4 in further detail.

As shown in the block diagram of FIG. 5, the magnetic switch 404 comprises a magnet 502 and a magnetic sensor 504. The electronic compass 406 comprises a Y-axis magnetic sensor 506 and an X-axis magnetic sensor 508. The magnet 502 can be a variety of magnets and is not limited to one specific type of magnet. For example, the magnet in a speaker, located within the portable information device, could be used for the magnet 502.

Figure 6:
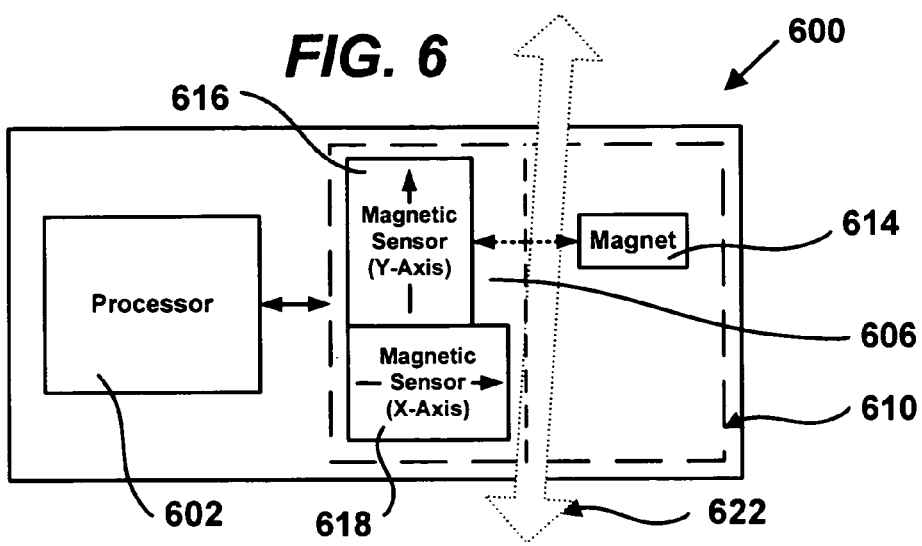
FIG. 6 is a block diagram of a device having a magnetic field sensing device for two-dimensional compassing and switching, according to a first embodiment of the invention.

FIG. 6 is a block diagram of one embodiment of a portable information device 600 comprising a processor 602 that communicates with a magnetic field sensing device 610 comprising both a magnetic switch and a two axis electronic compass integrated into one component. The electronic compass 606 is a two axis compass made up of a Y-axis sensor 616 and an X-axis sensor 618 that works in cooperation with the processor. A magnet 614 is used in combination with the Y-axis sensor 616 to realize a magnetic switch. This magnetic switch may also work in cooperation with the processor.

The Y-axis magnetic sensor serves a dual purpose; when the portable device is open it serves as an electronic compass component. Alternatively, when the portable device is closed, the magnet, in close proximity to the sensor, generates a signal that can be used by the processor or other components to de-active power, go to an idle processor state or various other functions (turn off or on external lights, etc.). As described FIGS. 1-3, the device may be opened or closed in a variety of ways. An axis 622 is labeled and is representative of any arbitrary axis of rotation or line of displacement or separation. Correspondingly, the magnet or sensor(s) may be brought together or placed apart in various ways.

It should also be noted that the sensor 618 and magnet 614 can be used for more than an open or closed signal. For example, the sensor, in close proximity to the magnet, may represent that a slideout keypad panel is pushed in. In this case, the portable information device is not necessarily closed; however, the signal of the keyboard panel being pushed in is generated by the magnet acting on the sensor. A variety of uses for the generated signal can be realized; therefore, this application is not limited to only an open or closed signal.

Figure 7:
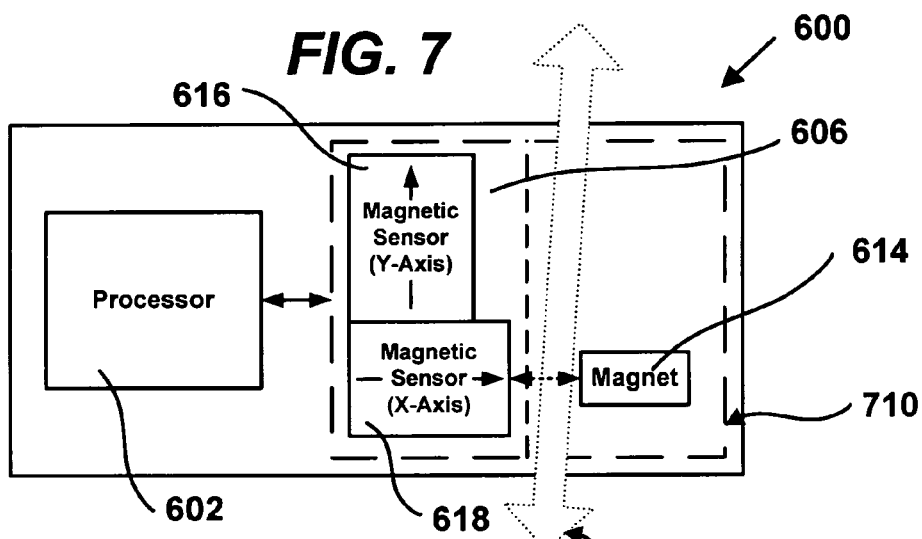
FIG. 7 is a block diagram of a device having a magnetic field sensing device for two-dimensional compassing and switching, according to a second embodiment of the invention.

FIG. 7 shows an alternative embodiment to that shown in FIG. 6, in which the magnet 614 works in combination with the X-axis sensor 618. In this embodiment, the X-axis sensor works as one axis of the electronic compass and it generates a signal when in proximity to the magnetic sensor. The signal may simply be a particular voltage level or range, for example.

Figure 8:
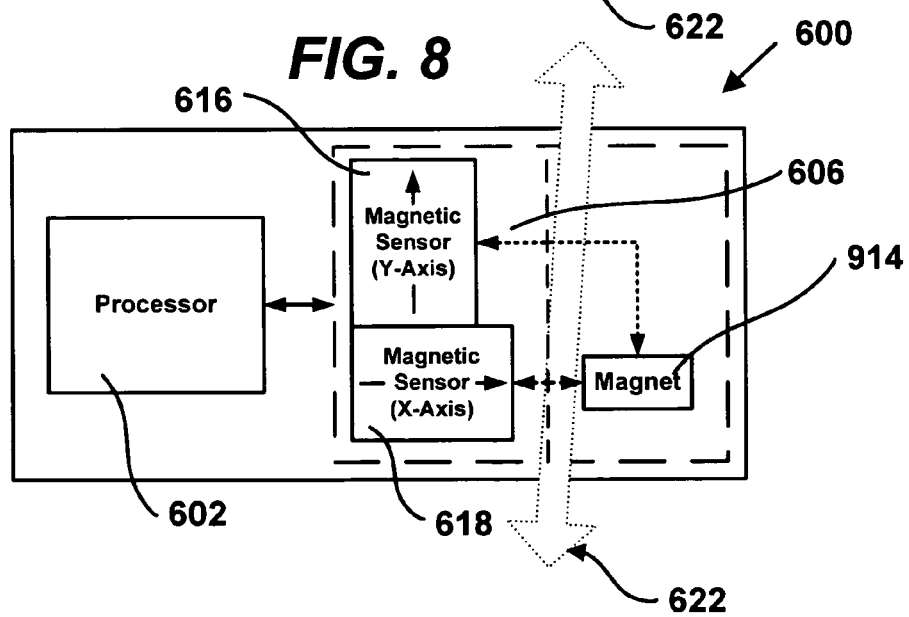
FIG. 8 is a block diagram of a device having a magnetic field sensing device for two-dimensional compassing and switching, according to a third embodiment of the invention.

FIG. 8 shows an alternative embodiment to that shown in FIG. 6, in which the magnet 614 can work in combination with either the Y-axis 616 or X-axis 618 sensors. The Y-axis or X-axis sensors both serve as independent axes of the electronic compass and either sensor can relay a signal that corresponds to the magnet being in close proximity to the sensor. Additionally, both signals may be used to generate the signal that the portable information device has been closed, or convey other information. For example, the X-axis sensor could be used for generating signals representative of the device being closed; the Y-axis sensor, on the other hand, could be used for generating a signal that a keypad has been slid out. This is quite possible as each sensor detects fields in different, often orthogonal, directions. So a magnet detected in the X-axis can be represented by a signal generated by a sensor aligned with X-axis and the same magnet detected in the Y-axis can be represented by a different signal generated by a sensor aligned with the Y-axis.

Figure 9:
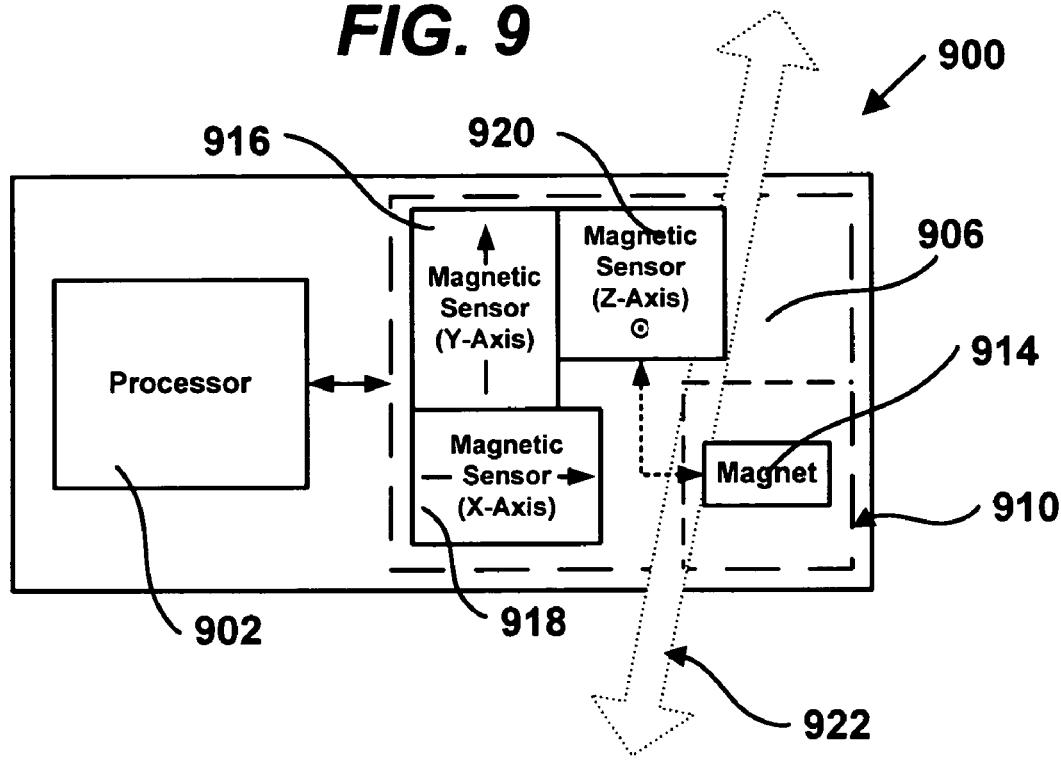
FIG. 9 is a block diagram of a device having a magnetic field sensing device for three-dimensional compassing and switching, according to a fourth embodiment of the invention.

FIG. 9 is another embodiment of a portable information device 900 comprising a processor 902 that communicates with a magnetic field sensing device 910 that comprises both a magnetic switch and a three axis electronic compass integrated into one component. The electronic compass 906 is a three axis compass made up of a Y-axis sensor 916, an X-axis sensor 918 and a Z-axis sensor 920 in communication with the processor 902. A magnet 914 is used in combination with the Z-axis sensor 920 to realize a magnetic switch. Similar to the previous embodiments, when the portable device is open, the Z-axis serves as an electronic compass component. When the device is closed, the Z-axis sensor 920 provides a signal corresponding to the device being closed. Alternatively, the X-axis sensor 918 or Y-axis sensor 916 could be used instead and a signal representing other information, besides the device being closed, can be generated using any one of the sensors.

Figure 10:
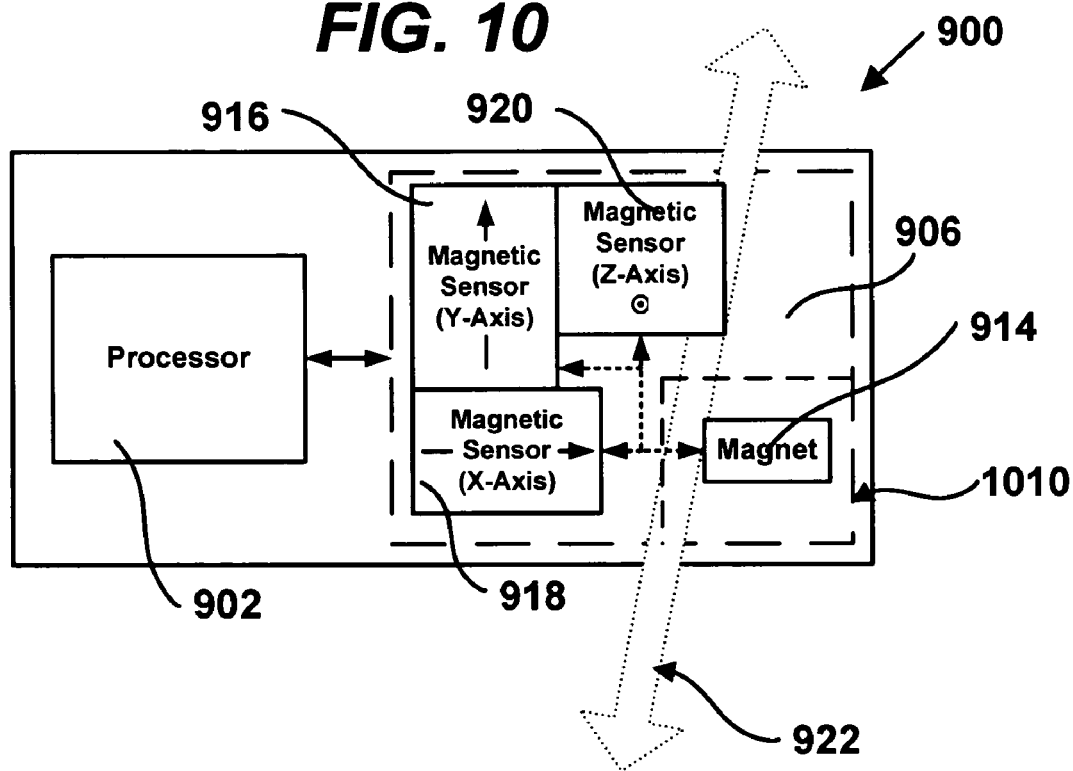
FIG. 10 is a block diagram of a device having a magnetic field sensing device for three-dimensional compassing and switching, according to a fifth embodiment of the invention.

FIG. 10 shows an alternative embodiment to FIG. 9 in which the magnet 914 works in combination with the Y-axis 916, X-axis 918 or Z-axis 920 sensors. All three axes serve as independent axes of the electronic compass and any one sensor can relay a signal that the device has been closed or convey various other types of information. Alternatively, two or more such signals may be used to relay a signal.

Figure 11:
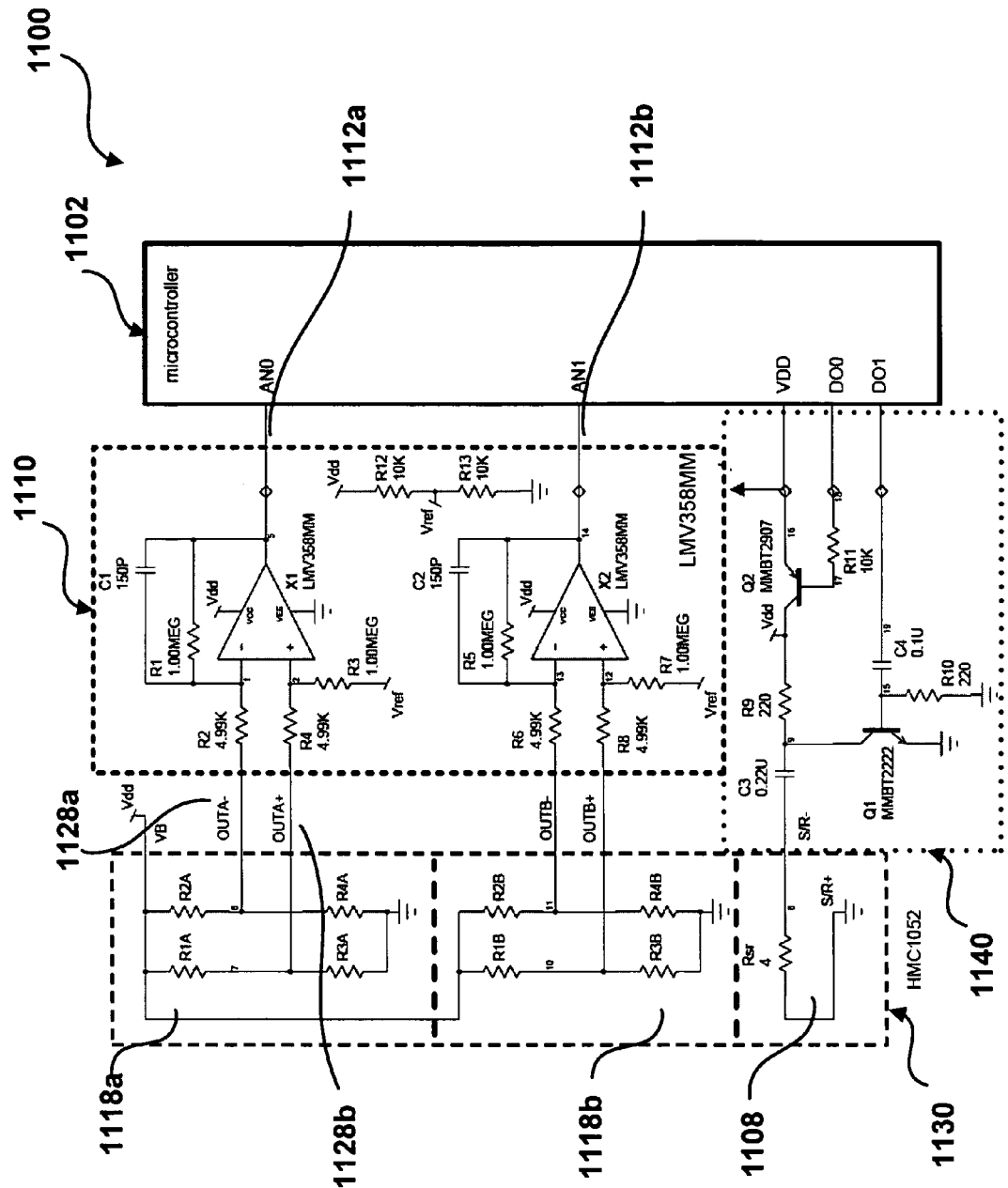
FIG. 11 is a circuit diagram of a magnetic field sensing device that can be assembled with standard electronic components.

FIG. 11 is a circuit diagram of one embodiment showing components that could be used to assemble a magnetic field sensing device 610 (FIG. 6). The signal from a two axis sensor 1130 (e.g. Honeywell part HMC1052, available from Honeywell International, Inc., Morristown, N.J., USA) is connected to a low voltage dual op amp 1110 (e.g. National Semiconductor LMV358MM, available from National Semiconductor Corporation, Santa Clara, Calif., USA) and in this embodiment, the output signal is connected to a microcontroller 1102, which serves the function of the processor 602 of FIG. 6. The output signal, however, is not limited to being used by only a microcontroller. Other circuit components, such as a comparator, can use or process the output signal.

The two axis sensor 1130 serves as the magnetic field sensing device and includes sensors 1118a and 1118b, which are orthogonally placed in Wheatstone bridge configurations. When a magnetic field is introduced or increased in the orientation that an axis of the sensor is intended to sense, the Wheatstone bridge creates a shift in output voltage across the output terminals OUTA+ and OUTA− 1128a or OUTB+ and OUTB− 1128b. The typical output range across these terminals is 2.7-3.6 V. The low voltage dual op amp 1110 amplifies the voltage difference about 200 times using op-amps 1112a and 1112b.

The microcontroller 1102 uses the output voltages 1122a and 1122b to digitize the result, process and manipulate the result (such as offset correction) and relay a signal to additional circuit components that generate electronic compass orientation. The microcontroller could also be set with a threshold input voltage to determine if the magnet within the cell phone (or other portable information device) is within close proximity to a sensor, or namely has been closed. For example, if either voltage 1112a or 1112b was above this threshold, the microcontroller would flag the event that the information processing device has been closed. As mentioned previously, however, this signal response could also be done with a comparator where one input terminal is the reference voltage and the other terminal is the output 1122a or 1122b from the op amp.

One additional use of the microcontroller is to send a signal to the set/reset strap 1108. In this embodiment, this is realized by using an output signal from the microcontroller along with additional circuitry 1140 to set and reset the resistive elements of the sensors 1118a and 1118b. The set/reset realigns the magnetic sensitive material that makes up the resistive elements of the sensors. This is advantageous in the event of a large magnetic field applied to the sensors. In the presence of a large magnetic field the sensors may deviate from their intended behavior and should be restored. In typical compassing applications using the HMC1052 sensor, a set/reset signal is pulsed about once a second. If longer battery lifetime is desired, this pulsing can be done less frequently or only at certain events. One such event would be when the portable information device is turned on or closed.

For further information on magnetic sensor designs, reference may be made to the following patents and/or patent applications, all of which are incorporated by reference herein:

U.S. Pat. No. 6,529,114, Bohlinger et al., "Magnetic Field Sensing Device"

U.S. Pat. No. 6,232,776, Pant et al., "Magnetic Field Sensor for Isotropically Sensing an Incident Magnetic Field in a Sensor Plane"

U.S. Pat. No. 5,952,825, Wan, "Magnetic Field Sensing Device Having Integral Coils for Producing Magnetic Fields"

U.S. Pat. No. 5,820,924, Witcraft et al., "Method of Fabricating a Magnetoresistive Sensor"

U.S. Pat. No. 5,247,278, Pant et al., "Magnetic Field Sensing Device"

U.S. patent application Ser. No. 09/947,733, Witcraft et al., "Method and System for Improving the Efficiency of the Set and Offset Straps on a Magnetic Sensor"

U.S. patent application Ser. No. 10/002,454, Wan et al., "360-Degree Rotary Position Sensor"

In addition, U.S. Pat. No. 5,521,501, to Dettmann et al., titled "Magnetic Field Sensor Constructed From a Remagnetization Line and One Magnetoresistive Resistor or a Plurality of Magnetoresistive Resistors" is also incorporated herein by reference, and may provide additional details on constructing a magneto-resistive sensor.

Figure 12:
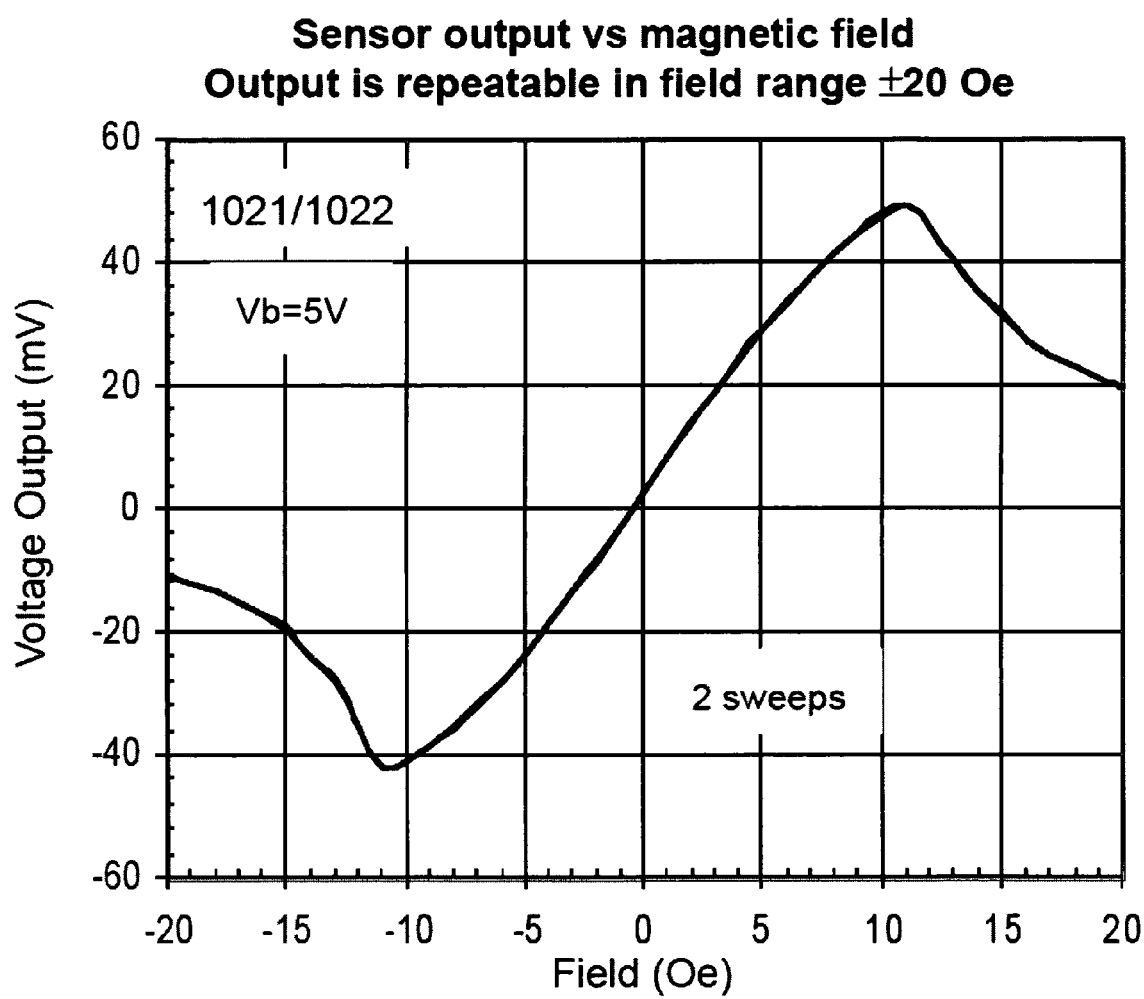
FIG. 12 is a graph showing the voltage response of a typical magnetic sensor in the presence of a magnetic field.

FIG. 12 is an example graph of the voltage output of one axis of the two axis sensor 1130. As the magnetic field strength increases, the voltage output increases. Note: 1 gauss equals 1 oersted in air. When using the magnetic field sensing device 610 (FIG. 6), the electronic compass portion of the device will operate in the linear regime of the graph displayed in FIG. 12; this corresponds to a limiting range of about −10 to 10 gauss (depending on the type of sensor). The sensor is very sensitive to small changes in magnetic field in this regime (approximately 100 μG). However, when a magnetic field, aligned with the sensor, is large enough to be outside the linear regime of the curve, the sensor is not useful for compassing applications and cannot discriminate between small changes in magnetic field.

Fortunately, when the sensor is saturated (or outside the linear regime), it is still useful. That is, it still conveys information. When the magnet within the portable information device is brought close to a sensor aligned in an orientation that it senses (e.g. the portable information device is closed), the magnetic field acting on the sensor will saturate the sensor. The sensor will then output a constant voltage representative of the non-linear region of the curve. Thus, a saturated sensor will create a constant output, indicative of the sensor being in close proximity to the magnet. The microcontroller 1102 or other circuit components can discriminate the difference in output voltage from the op amps 1112a or 1112b as the output voltage will be outside the operating range normally seen, or it will be at the constant output value normally seen when the sensors are being used for the electronic compass.

An embodiment of the present invention has been described above. Those skilled in the art will understand, however, that changes and modifications may be made to this embodiment without departing from the true scope and spirit of the present invention, which is defined by the claims.

We claim:

1. A portable information device comprising:
a magnet located at a first portion of the portable information device; an electronic compass located at a second portion of the portable information device, the second portion moveable with respect to the first portion, the electronic compass comprising at least one magnetic sensor responsive to the magnet, the at least one magnetic sensor operating in a first output mode when the first portion is at a first position relative to the second portion, the at least one magnetic sensor operating in a second output mode when the first portion is at a second position relative to the second portion; and a processor receiving a signal from the electronic compass, the processor determining when the at least one magnetic sensor is operating in the first output mode, and when the at least one magnetic sensor is operating in the second output mode, based on the signal from the electronic compass;

wherein the processor determines a position of the first portion relative to the second portion based on the signal from the electronic compass; and wherein when the at least one magnetic sensor is operating in the first output mode, the processor determines a compass direction based on the signal.

2. The portable information device of claim 1, wherein the first output mode is a non-saturated sensor output mode and the second output mode is a saturated sensor output mode.

3. The portable information device of claim 1, wherein the electronic compass comprises a first axis magnetic sensor and a second axis magnetic sensor.

4. The electronic compass of claim 3, wherein the first magnetic sensor is an x-axis sensor and the second magnetic sensor is a y-axis sensor.

5. The portable information device of claim 1, wherein the electronic compass comprises a first axis magnetic sensor, a second axis magnetic sensor and a third axis magnetic sensor.

6. The electronic compass of claim 5, wherein the first magnetic sensor is an x-axis sensor, the second magnetic sensor is a y-axis sensor and the third magnetic sensor is a z-axis sensor.

7. The portable information device of claim 1, wherein when the at least one magnetic sensor is operating in the second output mode, the processor deactivates at least part of the portable information device.

8. The portable information device of claim 1, further comprising at least one comparator operable to receive a signal from the at least one magnetic sensor when a presence of the magnet is detected by the at least one magnetic sensor, whereby the comparator digitizes a voltage signal from the at least one magnetic sensor.

9. A portable information device comprising:
a first portion having a magnet; and
a second portion having an electronic compass that includes at least one magnetic sensor, wherein the at least one magnetic sensor is responsive to the magnet; and wherein the portable information device outputs compass heading information based on an output of at least one magnetic sensor when the first portion is at a first position relative to the second portion; and wherein at least a part of the portable information device is deactivated based on the output of at least one magnetic sensor when the first portion is at a second position relative to the second portion.

10. The portable information device of claim 9, wherein the second portion is moveable with respect to the first portion.

11. The portable information device of claim 9, wherein the electronic compass comprises a first axis magnetic sensor and a second axis magnetic sensor.

12. The electronic compass of claim 11, wherein the first axis magnetic sensor is an x-axis sensor and the second axis magnetic sensor is a y-axis sensor.

13. The portable information device of claim 9, wherein the electronic compass comprises a first axis magnetic sensor, a second axis magnetic sensor, and a third axis magnetic sensor.

14. The electronic compass of claim 13, wherein the first axis magnetic sensor is an x-axis sensor, the second axis magnetic sensor is a y-axis sensor, and the third axis magnetic sensor is a z-axis sensor.

15. The portable information device of claim 9, further comprising a processor operable to receive a signal from the electronic compass to determine a compass direction.

16. The portable information device of claim 9, wherein a switch removes power to circuits contained by the portable information device based on the output of the at least one magnetic sensor when an output signal from the at least one magnetic sensor indicates that the least one magnetic sensor is saturated by the magnet.

17. A method for compassing and switching in a portable information device, comprising:
receiving a first signal from a magnetic sensor when the magnetic sensor is within a first distance from a permanent magnet, wherein the first signal is associated primarily with a field strength of the permanent magnet, wherein the magnetic sensor is located at a first portion of the portable information device, wherein the permanent magnet is located at a second portion of the portable information device, and wherein the first and second portions are movable with respect to one another;

receiving a second signal from the magnetic sensor when the magnetic sensor is further than the first distance from the permanent magnet, wherein the second signal is associated primarily with a field strength of the earth;

determining a compass heading from the second signal; and deactivating at least part of the portable information device based on receiving the first signal from the magnetic sensor.

18. The method of claim 17, wherein the first signal is in a first range of magnetic field strengths detectable by the magnetic sensor;

the second signal is in a second range of magnetic field strengths detectable by the magnetic sensor; and the second range is greater than the first range.

19. The method of claim 17, wherein the magnetic sensor is a two-axis magnetic sensor.

20. The method of claim 17, wherein the magnetic sensor is a three-axis magnetic sensor.

21. The method of claim 17, wherein the portable information device is a cell phone, having a keypad panel and a display panel, and wherein deactivating at least part of the portable information device includes removing power from a display on the display panel.

22. The method of claim 17 wherein the portable information device is a GPS receiver, wherein the first and second portions are selected from a cover panel and a display panel, and wherein the switching function includes removing power from a display on the display panel.

* * * * *